US012798949B2

(12) United States Patent
Vagnby et al.

(10) Patent No.: US 12,798,949 B2
(45) Date of Patent: Nov. 17, 2026

(54) BOTTLE STOP REMOVER

(71) Applicant: International Design House LTD, Kwun Tong (HK)

(72) Inventors: Marcus Vagnby, Holte (DK); Karina Mencke, Holte (DK)

(73) Assignee: INTERNATIONAL DESIGN HOUSE LTD, Kwun Tong (HK)

( * ) Notice: Subject to any disclaimer, the term of this patent is extended or adjusted under 35 U.S.C. 154(b) by 327 days.

(21) Appl. No.: 18/528,954

(22) Filed: Dec. 5, 2023

(65) Prior Publication Data

US 2024/0182286 A1 Jun. 6, 2024

(30) Foreign Application Priority Data

Dec. 6, 2022 (DK) ............................ PA2022 01103

(51) Int. Cl.
*B67B 7/04* (2006.01)
*B67B 7/06* (2006.01)

(52) U.S. Cl.
CPC ............ *B67B 7/0411* (2013.01); *B67B 7/063* (2013.01)

(58) Field of Classification Search
None
See application file for complete search history.

(56) References Cited

U.S. PATENT DOCUMENTS 1,350,383 A 8/1920 Palahniuk
1,657,728 A * 1/1928 Untiedt .................... B67B 7/44 30/316
3,359,838 A 12/1967 Vogel
4,291,597 A * 9/1981 Allen .................... B67B 7/0447 81/3.48
7,237,455 B2 * 7/2007 Taylor .................... B67B 7/063 81/3.09

(Continued)

FOREIGN PATENT DOCUMENTS

CH 100441 A * 7/1923 ............... B67B 7/10
DE 333808 C 3/1921

(Continued)

OTHER PUBLICATIONS

Espacenet machine translation of specification of publication TWI551535 (B)—Oct. 1, 2016,9 pages.

(Continued)

*Primary Examiner* — Monica S Carter
*Assistant Examiner* — Jonathan R Zaworski
(74) *Attorney, Agent, or Firm* — Francis J. Maguire; WARE FRESSOLA MAGUIRE & BARBER LLP

(57) ABSTRACT

A tool for removing of a cork or stop of a bottle is shown, as a single piece bottle stop remover and as an assembly having a primary and a secondary bottle stop remover. Such an assembly has both a primary and a secondary bottle stop remover. The primary bottle stop remover has a handle (1) with a gripping part (9), two legs (2, 3), a first end (4, 5) of each leg (2, 3) is fixed to the handle, wherein the handle (1) includes a through-going opening positioned at an outer surface between the at least two legs (2, 3) and a second opening (11) at the opposite outer surface of the handle (1). The secondary bottle stop remover has a handle section (12) and an insertion section (13), and in a use situation the insertion section (13) may be inserted into the through-going opening.

8 Claims, 2 Drawing Sheets

(56) References Cited

U.S. PATENT DOCUMENTS

| | | | | |
|---|---|---|---|---|
| 7,290,463 | B2 | 11/2007 | Taylor | |
| 8,707,828 | B2 * | 4/2014 | Ward | B67B 7/04 81/3.29 |
| 2007/0107556 | A1 | 5/2007 | Taylor | |

FOREIGN PATENT DOCUMENTS

| | | | |
|---|---|---|---|
| EP | 3 181 510 | A1 | 6/2017 |
| TW | I551535 | B | 10/2016 |

OTHER PUBLICATIONS

Extended European Search Report including a search opinion for EPO Application 23214180.4, dated May 3, 2034, 8 pages.
Search Report, Danish Patent and Trademark Office, Application No. PA 2022 01103, completed Apr. 3, 2023, 4 pages.
Search Opinion, Danish Patent and Trademark Office, Application No. PA 2022 01103, completed Apr. 3, 2023, 3 pages.
Machine Translation, Description of CH 100441 A, 1 page.
Machine Translation, Description of DE 333808 C, 2 pages.

* cited by examiner

BOTTLE STOP REMOVER

TECHNICAL FIELD OF THE INVENTION

The present invention relates to a tool for removing of a cork or stop of a bottle, also called a bottle stop remover or a cork puller. The invention relates to a single piece bottle stop remover and to an assembly comprising a primary and a secondary bottle stop remover.

BACKGROUND OF THE INVENTION

Two-prong cork pullers as such are known, e.g., from U.S. Pat. No. 3,359,838 where the general working of the tool is described in detail. This document relates to a bottle cork puller and protective sheath therefor of a type wherein the cork puller comprises a transverse handle and a pair of downwardly projecting laterally spaced spring legs for insertion in the neck of a bottle at opposite sides of the cork. The cork is gripped by the downward projection legs and through a turning and pulling force applied to the handle, the cork is drawn from the bottle. In this type of cork pullers, the legs are normally formed from a strip of relatively thin spring steel and are curved in cross section to substantially conform to the inside curvature of a bottle neck, with the result that substantial frictional resistance against turning is set up between the legs and the bottle neck surface, while at the same time there is, little resistance to turning relatively to the cork. Consequently, upon turning of the cork puller, the spring legs tend to move relatively to the cork without turning it, causing the sharp edges of the spring legs to abrade and crumble the cork.

U.S. Pat. No. 7,290,463 discloses a two-piece bottle stop remover for removing stops from bottles. This device allows removal of the entire stop, even if the stop is old and fragile, and with little risk that the stop might be pushed into the bottle. The device comprises a stabilizer for gaining purchase or gaining grip within the stop and works together with an integrated or connected element that is preferably greater in at least one dimension than the inner diameter of the bottle opening for preventing the stop from being pushed into the bottle. Insert members may also be provided and may be inserted between the stop and the inner wall of the bottle. In some embodiments, a handle may be connected directly to the insert members and/or connected detachably to the stabilizer for applying a force to insert the stabilizer and/or to insert the insert members and/or to extract the stop. According to this device, the stabilizer comprising the screw may prevent the stop from being pushed into the bottle when the insert members of the two-prong puller are inserted. The insert members may extract the stop without leaving the outside of the stop remaining on the inner wall of the bottle opening.

CH 100441 A discloses a cork remover for removing cork plugs from inside bottles. The cork remover makes it possible to remove a cork plug that is lost inside a narrow-necked bottle. The cork remover comprises a sleeve 1 provided with a handle 2 at one end and at the opposite lower end the cork remover is formed into a fork 3 between the legs of which there is space for the cork. By swivelling the bottle, the cork to be lifted out of the bottle belly is brought between the legs of the fork 3 and the fork 3 is then pulled into the bottle neck, so that the cork is clamped by the resilient legs. When the cork is clamped between the legs of the fork 3, the cork can be drilled by means of a corkscrew 4, which is mounted in the sleeve 1 so that it can rotate and slide axially. The cork, clamped by the fork 3 and held firmly by the corkscrew 4, may then be safely removed from the inside of the bottle through the neck of the bottle. According to this device, the legs 3 and the corkscrew 4 are part of the same tool making the cork remover unsuitable as a bottle stop remover.

The bottle stop remover according to the present invention may work both as a single piece bottle stop remover or cork puller/screw provided with an improved gripping part, and it may also work as an assembly comprising a primary and a secondary bottle stop or cork remover which may be applied in case that the primary remover does not work satisfying by itself.

SUMMARY OF THE INVENTION

Thus, an object of the present invention relates to provide a bottle stop remover which may be used to remove fragile bottle stops or bottle stops which for other reasons are difficult to remove in a complete state i.e. without destroying the bottle stop.

In particular, it is an object of the present invention to provide an assembly that improves the possibility for removing the complete bottle stop without disintegration of it.

Thus, the invention relates to an assembly comprising a primary bottle stop remover comprising a handle (1) comprising a gripping part (9), at least two legs (2, 3) each comprising a first end (4, 5) and a second opposite end (6, 7), the first end (4, 5) of each leg (2, 3) is fixed to the handle at different positions with a distance d1 between the positions, wherein the handle (1) comprises a through-going opening extending between a first opening (10) and a second opening (11) where the first opening (10) is positioned at an outer surface between the at least two legs (2, 3) and the second opening (11) is positioned at the opposite outer surface of the handle (1), and comprising a secondary bottle stop remover comprising a handle section (12) and an insertion section (13) with a diameter smaller than the diameter of the straight through-going opening of the primary bottle stop remover, which insertion section (13) is configured or adapted to be inserted into the through-going opening of the primary bottle stop remover.

Also, the handle section (12) of the secondary bottle stop remover is normally configured or adapted to move freely relative to the gripping part (9) of the primary bottle stop remover while the secondary bottle stop remover is turned relative to the first bottle stop remover during insertion of the insertion section from a point where the insertion section (13) is inserted into the straight through-going opening (10, 11) and until the secondary bottle stop remover is in its final or end position.

According to an embodiment of the invention, the through-going opening may be provided with internal guiding means (14) such as an internal screw thread.

According to an embodiment of the invention, the handle (1) comprises an extension part (8) which during use is positioned between the gripping part (9) and a bottle stop to be removed after the bottle stop remover has been inserted into the bottle stop. The extension part (8) may be shaped like a cylinder or like a truncated cone having a round or rounded perimeter, optionally the length of the perimeter may be constant or vary along the length of the extension part, preferably the length—corresponding to the distance applied between the gripping part (9) and the top of the bottle/bottle neck during use—of the extension part (8) is 0.01-0.04 m.

According to an embodiment of the invention, the through-going opening may be centralized relative to the at least two legs (2, 3). I.e., the center of the through-going opening is positioned at the distance ½$d_1$ from each of the legs (2, 3).

According to an embodiment of the invention, a surface—a downward surface in the FIGS. 3 and 4A—of the handle section (12) of the secondary bottle stop remover faces a corresponding surface—an upward surface in the FIGS. 1 and 2B—of handle (1) or gripping part (9) of the primary bottle stop remover and the two surfaces fit or correspond to each other to such an extent that the gripping part (9) of the primary bottle stop remover and the handle (12) of the secondary bottle stop remover feels like a single handle during use.

When using an assembly according to the invention, it is possible to establish a centering of the insertion section of the secondary bottle stop remover relative to the bottle stop as the through-going opening of the primary bottle stop remover defines where the insertion section (13) of the secondary bottle stop is to be inserted into and through the bottle stop. Normally, this position is central relative to the bottle stop and therefore central relative to the positions (4, 5) of the two legs (2,3).

The present invention will now be described in more detail in the following.

DETAILED DESCRIPTION OF THE INVENTION

Definitions

Prior to discussing the present invention in further details, the following terms and conventions will first be defined:

In general—this expression is used when the defined feature(s) may be used together with all embodiments of the invention.

Bottle stop—a bottle stop may be any type of cork or plastic or similar material which prevents air from entering a bottle and wine or other liquid from leaving the bottle.

It should be noted that embodiments and features described in the context of one of the aspects of the present invention also apply to the other aspects of the invention.

Figure 1:
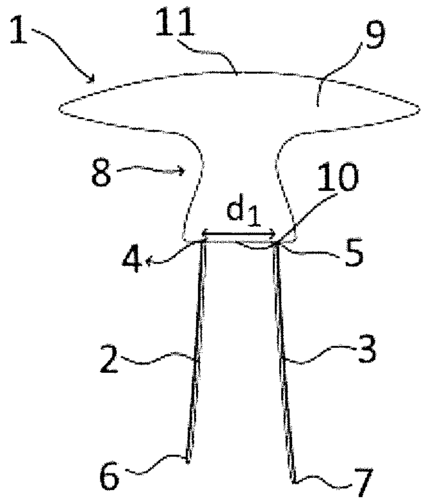
FIG. 1 shows a side view of an embodiment of a single piece or primary bottle stop remover according to the invention.
Figure 2A:
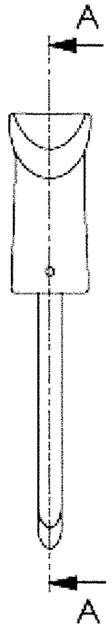
FIG. 2A shows an edge view of the embodiment of FIG. 1 rotated ninety degrees.
Figure 2B:
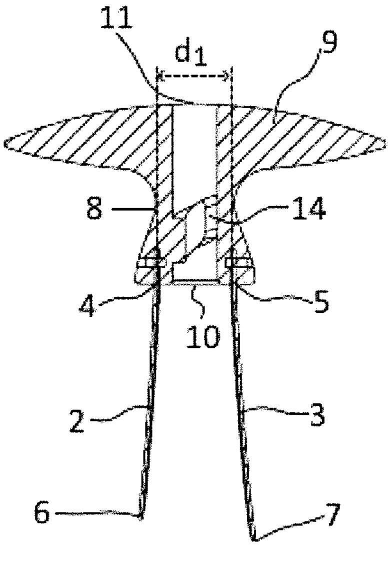
FIG. 2B shows section A-A of FIG. 2A as a cut-through view of the same embodiment as FIG. 1.

FIGS. 1, 2A and 2B show an embodiment of a single piece or primary bottle stop remover according to the invention. The single piece or primary bottle stop remover comprises a handle 1 comprising a gripping part 9, and at least two legs 2, 3 each leg comprising a first end 4, 5 and a second opposite end 6, 7, where the first end 4, 5 of each leg 2, 3 is fixed to the handle 1 at different positions with a distance $d_1$ between these positions. Bottle stop removers of this type and how to use such bottle stop removers are generally known.

According to the invention, the handle 1 of the bottle stop remover further comprises a through-going opening extending between a first opening 10 and a second opening 11 where the first opening 10 is positioned at an outer surface of the handle 1 between the at least two legs 2, 3 and the second opening 11 is positioned at the opposite outer surface of the handle 1. The first opening 10 has a diameter or perimeter smaller than $d_1$. In general, the through-going opening is straight, where "straight" means that a central line of the through-going opening extends uniformly in one direction, without a curve or bend. A bottle stop may be removed by first inserting the legs 2, 3 of the primary bottle stop remover and then turning and pulling the gripping part 9 of the handle 1 causing the legs 2, 3 to grip the bottle stop making it possible to draw the bottle stop out of a bottle neck. The through-going opening of the handle 1 allows for insertion of a designated secondary bottle stop remover.

The through-going opening may be provided with internal guiding means 14 such as an internal screw thread to adapt the through-going opening for receiving and guiding an insertion section 13 such as a helical section of a secondary bottle stop remover through the through-going opening. The internal guiding means 14 may ensure that the insertion section 13 is inserted exactly where it is supposed to be inserted such as in the middle of a bottle stop.

In general, the handle 1 may comprise an extension part 8 positioned between the gripping part 9 and a top surface of a bottle or a bottle neck during use. If the handle 1 comprises an extension part 8, the first opening 10 is positioned at an outer surface of the extension part 8 between the at least two legs 2, 3 and the second opening 11 is positioned at the opposite outer surface of the gripping part 9. The extension part 8 may be shaped like a cylinder or like a truncated cone having a round or rounded perimeter i.e. the length of the perimeter may be constant or vary along the length of the extension part. Normally, the length of the extension part 8 is between 0.01-0.04 m allowing a user to position his/her fingers around the gripping part above the bottle or bottle neck. The presence of an extension part makes it possible to hold on to the gripping part with one hand as the extension part 8 can be held between two fingers, such as the index finger and the middle finger, while the fingers as such are clasped around the gripping part 9. Other suitable positions of a hand during pulling of the bottle stop may be adapted due to the presence of the extension part. "Rounded" means that the perimeter may be oval or similar without sharp edges.

Figure 3:
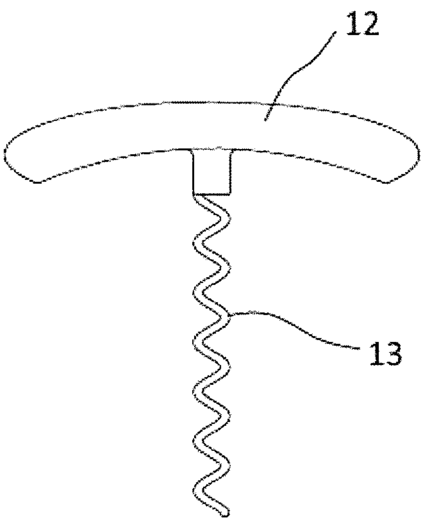
FIG. 3 shows a side view of an embodiment of a secondary bottle stop remover.

FIG. 3 shows an embodiment of a secondary bottle stop remover which may be used in combination with a primary bottle stop remover. The secondary bottle stop remover comprises a handle section 12 and an insertion section 13 in form of a helical section. This type of bottle stop remover is generally known. Alternatively, the insertion section 13 may be in form of a spear-like member which purpose is to increase the diameter/perimeter of the bottle stop matter, which is positioned between the legs 2, 3.

Figures 4A, 4B, 4C:
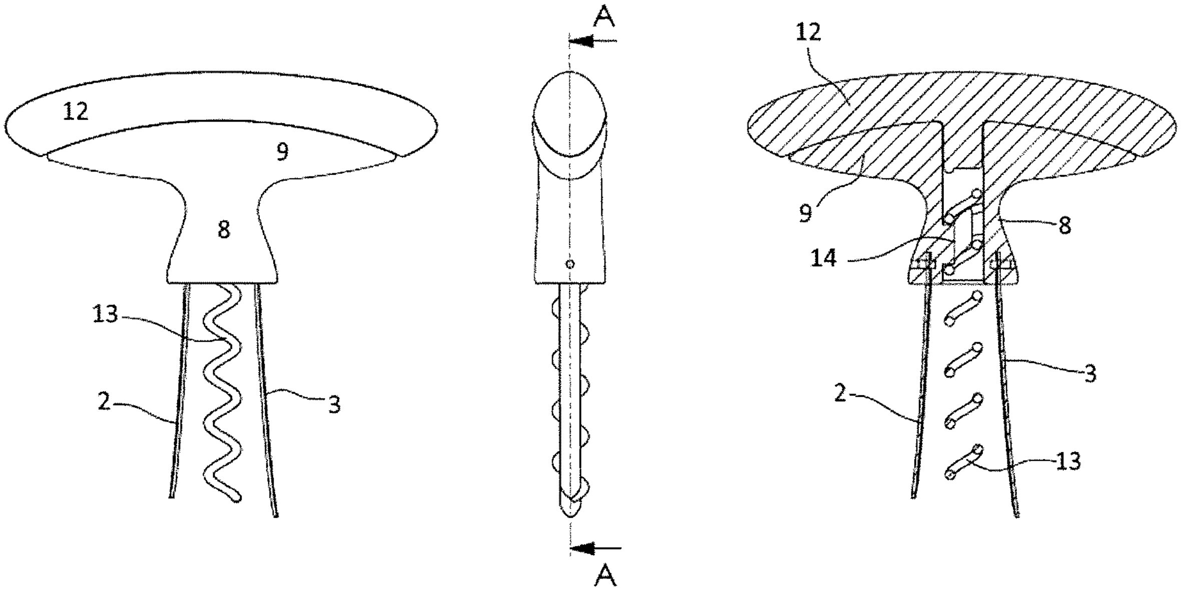
FIG. 4A shows an embodiment of an assembly of a primary and secondary bottle stop remover according to the invention.
FIG. 4B shows an edge view of the assembly of FIG. 4A.
FIG. 4C shows section A-A of FIG. 4B.

FIG. 4A shows an assembly of a primary and secondary bottle stop remover where the primary bottle stop remover is the embodiment shown in FIGS. 1, 2A and 2B, and the secondary bottle stop remover is the embodiment shown in FIG. 3. The secondary bottle stop remover comprises a handle section 12 and an insertion section 13 having an outer diameter smaller than the inner diameter of the through-going opening of the primary bottle stop remover.

In FIG. 4A, the insertion section 13 in the form of a helical section has been inserted through the through-going opening of the handle 1 extending between the second opening 11 and the first opening 10 between the two legs 2 and 3. FIG. 4B shows an edge view of the assembly of FIG. 4A, and FIG. 4C shows section A-A of FIG. 4B. According to this embodiment, a downward surface of the handle section 12 of the secondary bottle stop remover faces an upward surface of the gripping part 9 of the primary bottle stop remover and the two surfaces are adapted to fit or correspond to each other in such a way that the joined handle section 12 of the secondary bottle stop remover and the handle part 1 of the primary bottle stop remover feels like one unit and may be used/handled by a single hand.

When using an assembly according to the invention to remove a bottle stop, the following steps may be performed:

The legs 2, 3 of the primary bottle stop remover are inserted through the bottle stop, the legs 2, 3 may slide along the inner surface of an opening such as a bottle neck in which opening the bottle stop is mounted.

Then the insertion section 13 of the secondary bottle stop remover is inserted through the through-going opening, first in through the second opening 11 at the outer surface of the handle 1 and then out through the first opening 10 between legs 2, 3.

Then the insertion section 13 is inserted into or through the bottle stop, if the insertion section 13 is helical the insertion into or through the bottle stop is performed by turning the insertion section 13 into or through the bottle stop, or if the insertion section 13 is spear-like the insertion is performed by pressing/forcing the insertion section 13 into or through the bottle stop in a straight line.

When the insertion section 13 is at its end or final position, then the user may remove the bottle stop by pulling the combined handle away from the opening from where the bottle stop is to be removed. When the insertion section 13 is fully inserted the primary and secondary bottle stop removers become locked together and the legs 2, 3 and the insertion section will jointly retain the bottle stop and ensure that the bottle stopper is removed as a whole.

| Ref. no. | Ref. name |
|---|---|
| 1 | Handle of single or primary bottle stop remover |
| 2 | First leg |
| 3 | Second leg |
| 4 | First end of first leg |
| 5 | First end of second leg |
| 6 | Second end of first leg |
| 7 | Second end of second leg |
| 8 | Extension part of handle |
| 9 | Gripping part of handle |
| 10 | First opening at outer surface of handle |
| 11 | Second opening at outer surface of handle |
| 12 | Handle section of secondary bottle stop remover |
| 13 | Insertion section of secondary bottle stop remover |
| 14 | Internal guiding means |

The invention claimed is:

1. An assembly, comprising:

a primary bottle stop remover comprising a handle (1) comprising a gripping part (9), at least two legs (2, 3) each comprising a first end (4, 5) and a second opposite end (6, 7), the first end (4, 5) of each respective leg (2, 3) is fixed to the handle at correspondingly different positions that are spaced apart by a distance d1 between the different positions, wherein the handle (1) comprises a straight through-going opening extending between a first opening (10) and a second opening (11) where the first opening (10) is positioned at an outer surface between the at least two legs (2, 3) and the second opening (11) is positioned at an opposite outer surface of the handle (1), wherein the assembly comprises a secondary bottle stop remover comprising a handle section (12) and a helical insertion section (13) with an outer diameter smaller than an inner diameter of the straight through-going opening of the primary bottle stop remover and configured for insertion into or through a bottle stop in a bottle neck for removal of the bottle stop from the bottle neck, and the helical insertion section (13) is configured for insertion into the straight through-going opening of the primary bottle stop remover, wherein the straight through-going opening comprises internal guiding means (14) comprising an internal screw thread configured to engage with the helical insertion section (13).

2. The assembly according to claim 1, wherein a surface of the handle section (12) of the secondary bottle stop remover faces a corresponding surface of handle (1) of the primary bottle stop remover and the surface of the handle section (12) and the corresponding surface of handle (12) fit or correspond to each other.

3. The assembly according to claim 1, wherein the handle (1) comprises an extension part (8) that during use is positioned between the gripping part (9) and the bottle stop in the bottle neck.

4. The assembly according to claim 3, wherein the extension part (8) is shaped like a cylinder or like a truncated cone having a round or rounded perimeter with a length that is constant or that varies along a length of the extension part.

5. The assembly according to claim 1, wherein the through-going opening is centralized relative to the at least two legs (2, 3).

6. The assembly according to claim 1, wherein the helical insertion section (13) is configured for turning into or through the bottle stop.

7. The assembly according to claim 1, wherein the assembly of the primary bottle stop remover and the secondary bottle stop remover is configured for removal of the bottle stop, the primary bottle stop remover is configured for removal of the bottle stop by itself, and the secondary bottle stop remover is configured for removal of the bottle stop by itself.

8. The assembly according to claim 2, wherein the assembly of the primary bottle stop remover and the secondary bottle stop remover is configured for removal of the bottle stop or the secondary bottle stop remover is configured for removal of the bottle stop by itself.

* * * * *